US007190813B2

(12) United States Patent
Daley et al.

(10) Patent No.: US 7,190,813 B2
(45) Date of Patent: Mar. 13, 2007

(54) SYSTEMS AND METHODS FOR INSPECTING NATURAL OR MANUFACTURED PRODUCTS

(75) Inventors: Wayne Dwight Roomes Daley, Snellville, GA (US); Douglas Frank Britton, Alpharetta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 752 days.

(21) Appl. No.: 10/612,203

(22) Filed: Jul. 2, 2003

(65) Prior Publication Data

US 2004/0136569 A1 Jul. 15, 2004

Related U.S. Application Data

(60) Provisional application No. 60/440,191, filed on Jan. 15, 2003.

(51) Int. Cl.
*G06K 9/00* (2006.01)

(52) U.S. Cl. ....................................... 382/110; 426/499

(58) Field of Classification Search ................ 382/110; 426/11, 34, 42, 56, 61, 119, 235, 237, 244, 426/128–133, 143, 499, 623, 635, 389, 395; 99/416, 448, 452, 467, 477, 479, 482, 483, 99/485, 487

See application file for complete search history.

(56) References Cited

U.S. PATENT DOCUMENTS

| | | | | |
|---|---|---|---|---|
| 4,723,261 | A | 2/1988 | Janssen et al. | 378/99 |
| 4,729,379 | A | 3/1988 | Ohe | 128/654 |
| 4,870,692 | A | 9/1989 | Zuiderveld et al. | 382/6 |
| 4,963,740 | A | 10/1990 | Asai et al. | 250/327.2 |
| 5,206,918 | A | 4/1993 | Levene | 382/17 |
| 5,335,293 | A | 8/1994 | Vannelli et al. | 382/17 |
| 5,647,360 | A | 7/1997 | Bani-Hashemi et al. | 128/653.1 |
| 5,659,624 | A * | 8/1997 | Fazzari et al. | 382/110 |
| 5,732,147 | A | 3/1998 | Tao | 382/110 |
| 5,960,098 | A * | 9/1999 | Tao | 382/110 |
| 6,061,476 | A | 5/2000 | Nichani | 382/270 |
| 6,269,194 | B1 | 7/2001 | Nichani | 382/270 |
| 6,336,082 | B1 | 1/2002 | Nguyen et al. | 702/179 |
| 6,410,872 | B2 | 6/2002 | Campbell et al. | 209/577 |
| 6,587,575 | B1 * | 7/2003 | Windham et al. | 382/110 |

* cited by examiner

*Primary Examiner*—Jingge Wu
*Assistant Examiner*—Abolfazi Tabatabai
(74) *Attorney, Agent, or Firm*—Thomas, Kayden, Horstemeyer, & Risley, LLP

(57) ABSTRACT

Systems and methods for inspecting food products are presented in which contrast images are generated by subtracting reference data from an acquired sample image. Processing of the data is performed on the contrast image, which results in improved defect detection.

22 Claims, 10 Drawing Sheets

SYSTEMS AND METHODS FOR INSPECTING NATURAL OR MANUFACTURED PRODUCTS

CROSS REFERENCE TO RELATED APPLICATIONS

This application claims the benefit of U.S. provisional patent application Ser. No. 60/440,191, filed Jan. 15, 2003, which is incorporated herein by reference in its entirety.

FIELD OF THE INVENTION

The present disclosure relates generally to natural products and, more particularly, to systems and methods for inspecting food products.

BACKGROUND

Inspection and grading of food products, such as grapefruit, tomatoes, poultry, etc. are labor-intensive tasks. Typically, these labor-intensive tasks require visual inspection of the food products to determine whether or not the food products possess any desirable, undesirable, or unacceptable defects. Often, the process involves a subjective evaluation of the food products by quality-control personnel. The subjective evaluation results in a great variance within the range of the food products that are considered acceptable with in the industry.

Due to these variances resulting from the subjectivity of the evaluator, as well as the difficulty of conducting these operations at line rates for extended periods of time, the industry has sought to automate the implementation of the inspection and grading process. However, the task of grading non-uniform objects is nontrivial. Thus, despite the various mechanized processes available for automatically sorting food products, there is still a need in the industry for a better system and method for inspecting and grading food products.

SUMMARY

The present disclosure provides systems and methods for inspecting food products.

In a broad sense, the several embodiments presented herein utilize a process in which contrast data is generated as a function of reference data and acquired sample data. The contrast data has contrast features, which represent deviations between the sample data and the reference data. The contrast data is used to determine an acceptability level of a sample product.

While example embodiments are disclosed herein, it should be appreciated that the invention is not limited only to the disclosed embodiments. To the contrary, other systems, methods, features, and advantages are intended to be included within this description, as would be appreciated by those having skill in the art.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

While several embodiments are described in connection with these drawings, there is no intent to limit the invention to the embodiment or embodiments disclosed herein. On the contrary, the intent is to cover all alternatives, modifications, and equivalents.

In general, studies have shown that, in operation, the human visual cortex distinguishes objects by detecting contrast. In this regard, when visible defects (or other visible discrepancies or variants) are present in certain objects, those variants are detected in human vision by observing the contrast between the normal portion of the object and the defective portion of the object. Since the defective portion displays a visual appearance that is different from the normal portion, a contrast is generally present at the boundary between the normal portion and the defective portion. Studies have shown that these contrasts facilitate the detection of defects.

The disclosed systems and methods show that greater accuracy, consistency, and robustness are obtainable when such contrast features form the basis for machine-vision-based defect detection. For example, in mechanical or automatic sorting of grapefruits, the use of contrast-based images improves the accuracy and reliability of the inspection and sorting process. Similarly, in automatic defect detection in chicken breasts, the employment of contrast features provides greater accuracy and reliability. Additionally, in sorting any product that exhibits inter-product and intra-product heterogeneity, the analysis performed on the contrast image results in more robust data processing despite the relative gain in computational burden due to the generation of a contrast image (or contrast-based image). Unlike systems that acquire reference images and calculate acceptance or rejection criteria from the reference images, the disclosed system and method generate a contrast image from acquired reference images and sample images. Thereafter, acceptance and rejection criteria are calculated from the contrast images. Hence, unlike other approaches that utilize a reference image, the disclosed approach performs a bulk of the processing in the "contrast space," rather than "normal space."

FIGS. 1 through 10 describe several embodiments of systems and methods that may be employed to generate contrast-based images and analyze those contrast-based images for detecting defects in heterogeneous products. It should be appreciated that, while grapefruits and chicken breasts are used to specifically illustrate products exhibiting inter-product heterogeneity and intra-product heterogeneity, the systems and methods disclosed herein may be employed in defect detection for any product (natural or synthetic) that displays inter- and intra-product heterogeneity.

Figure 1:
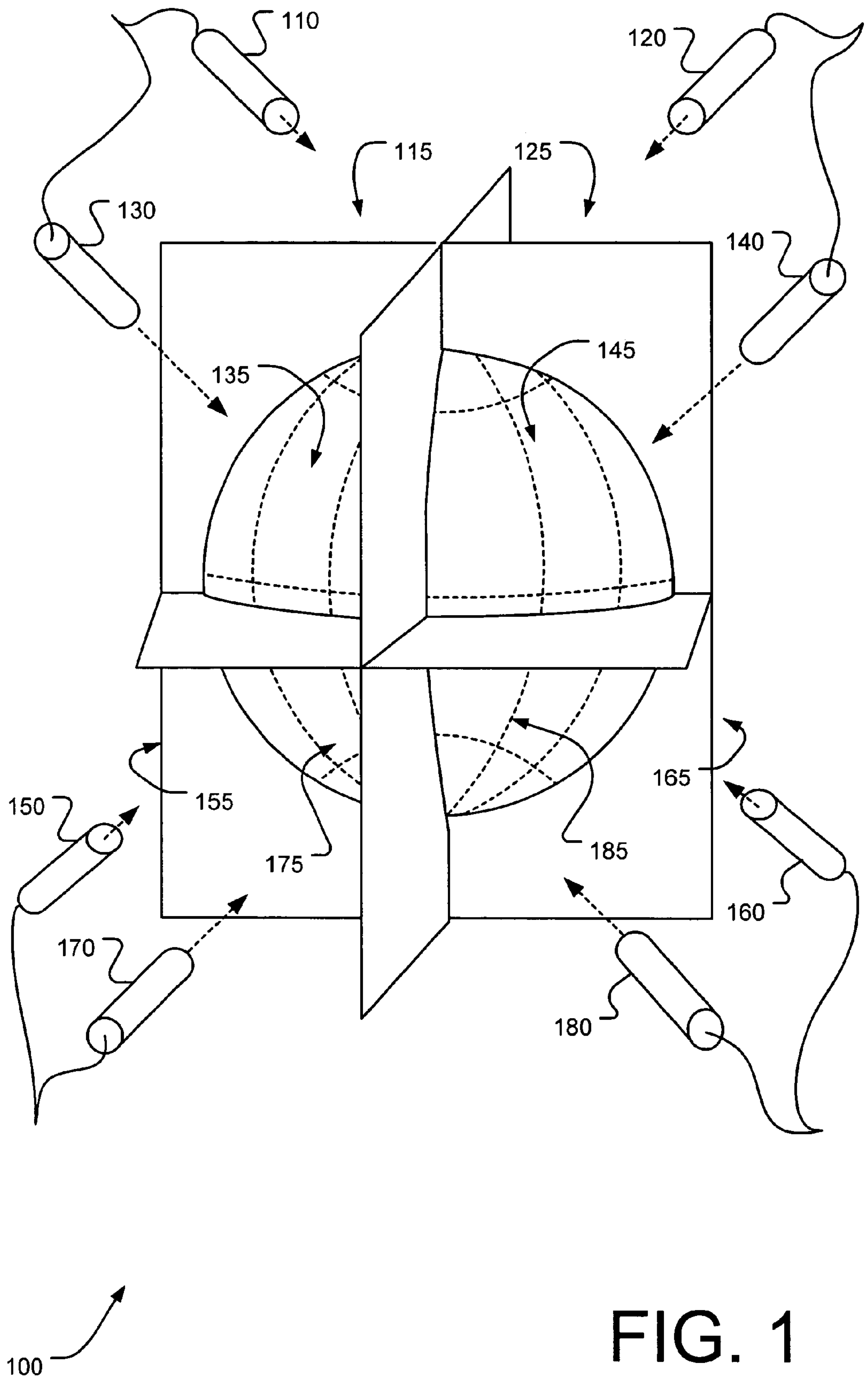
FIG. 1 is a diagram showing an example setup for acquiring images of spherical samples.

FIG. 1 is a diagram showing an example setup 100 for acquiring images of spherical samples. For example, the setup 100 may be used to acquire images of oranges, grapefruits, or other spherical food products. In fact, it should be appreciated that the setup 100, while conducive to acquiring images of spherical objects, may further be used to acquire full surface images of any three-dimensional object. As shown in FIG. 1, the setup 100 divides the spherical object into eight octants 115, 125, 135, 145, 155, 165, 175, 185. A camera 110, 120, 130, 140, 150, 160, 170, 180 is positioned in front of each respective octant 115, 125, 135, 145, 155, 165, 175, 185, thereby permitting image acquisition of each octant 115, 125, 135, 145, 155, 165, 175, 185 by its corresponding camera 110, 120, 130, 140, 150, 160, 170, 180. Since the image from each of the eight octants overlaps with portions of the image from adjacent octants, a combination of all eight acquired images is typically sufficient to construct a surface projection of the entire three-dimensional object.

Figure 2:
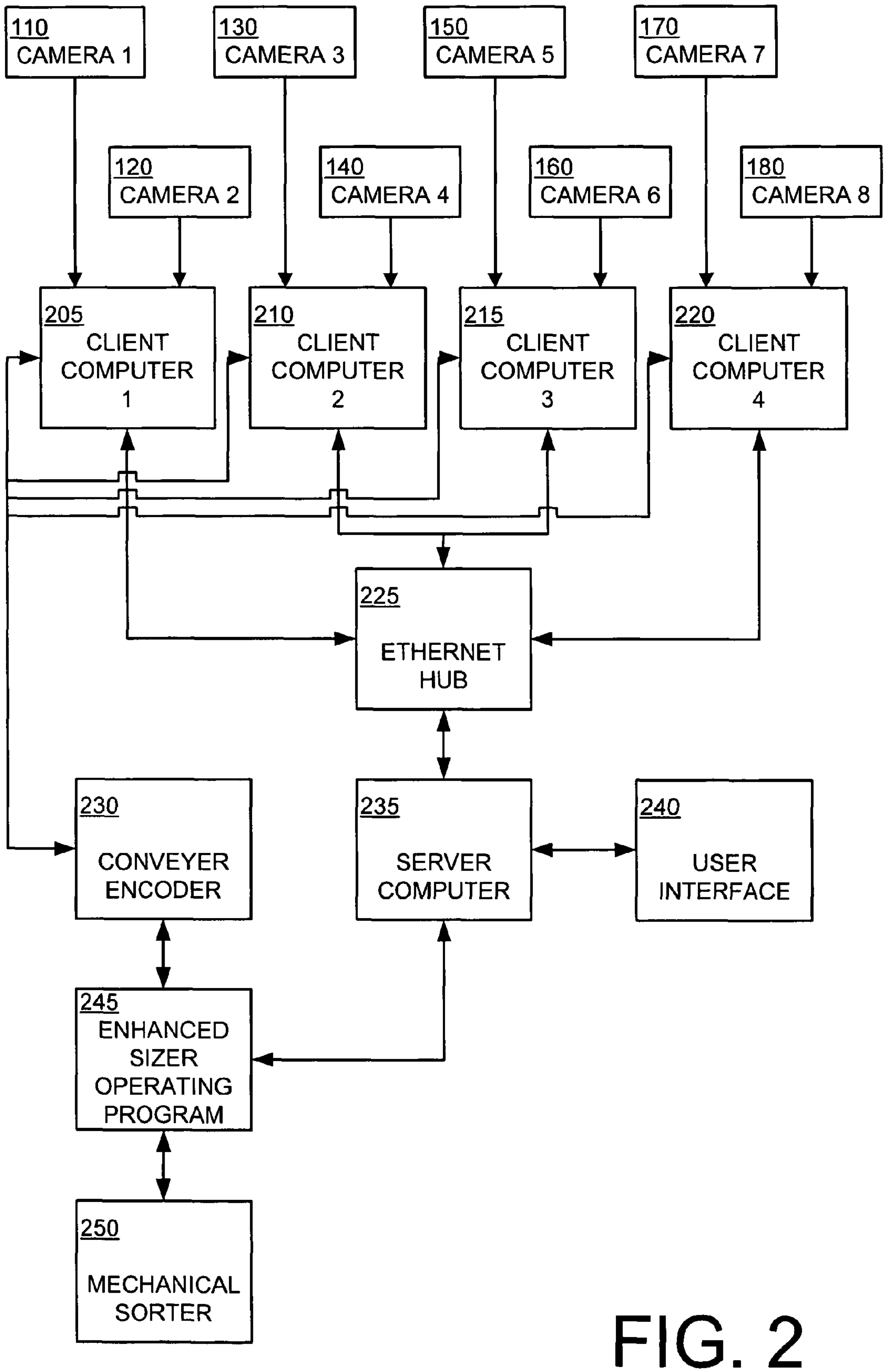
FIG. 2 is a block diagram showing equipment for processing images acquired using the setup of FIG. 1.

FIG. 2 is a block diagram showing equipment associated with several embodiments for processing images acquired using the setup 100 of FIG. 1. Since images are acquired for eight octants 115, 125, 135, 145, 155, 165, 175, 185, the image acquisition equipment includes each of the eight cameras 110, 120, 130, 140, 150, 160, 170, 180 that are configured to acquire the image from each of their corresponding octants. The image processing hardware includes a conveyor encoder 230, four client computers 205, 210, 215, 220, an Ethernet hub 225, a server computer 235, a user interface 240, and a standard (STD) bus computer having a program 245 that is responsible for controlling a mechanical sorter 250.

The conveyer encoder 230 is operatively coupled to the four client computers 205, 210, 215, 220. The client computers 205, 210, 215, 220 are triggered by the conveyor encoder 230 as the sample moves within imaging range of the eight cameras 110, 120, 130, 140, 150, 160, 170, 180. The triggering by the conveyor 230 permits image acquisition of the eight octants of the sample. Each of the eight cameras 110, 120, 130, 140, 150, 160, 170, 180 are operatively coupled to at least one of the four client computers 205, 210, 215, 220. The client computers 205, 210, 215, 220 control the operation of the eight cameras 110, 120, 130, 140, 150, 160, 170, 180. Thus, the client computers control image acquisition by each of the cameras. Additionally, the coupling of the cameras to the client computers permits transfer of acquired images from the cameras to the client computers. In an example embodiment, each of the four client computers 205, 210, 215, 220 is configured to receive the acquired images from two of the eight cameras 110, 120, 130, 140, 150, 160, 170, 180 as shown in FIG. 2.

Once the acquired images are transferred to the client computers 205, 210, 215, 220, each of the client computers generates regions of interest (ROI) that are associated with their respective octants, and the ROIs are subsequently used to grade or sort samples. Once the client computers 205, 210, 215, 220 have graded or sorted the samples, the results obtained from each of the client computers is then transmitted to the server computer 235 over the Ethernet hub 225. Upon receiving the results from each of the client computers 205, 210, 215, 220, the server computer 235 aggregates the results and performs a final grading or sorting of the samples based on the aggregate of the results.

Greater details related to the grading or sorting of the samples are provided with reference to FIGS. 4 through 8. It should be appreciated that, while eight cameras and four client computers are shown with reference to FIG. 2, the number of cameras and number of client computers need not be fixed to eight and four, respectively. Rather, the number of cameras and client computers may be varied to concomitantly vary the processing performance that may be required of the system. Additionally, it should be appreciated that a single computer may be used in place of the client-server architecture shown in the embodiment of FIG. 2. One such embodiment is shown in greater detail with reference to FIG. 9.

Figure 3:
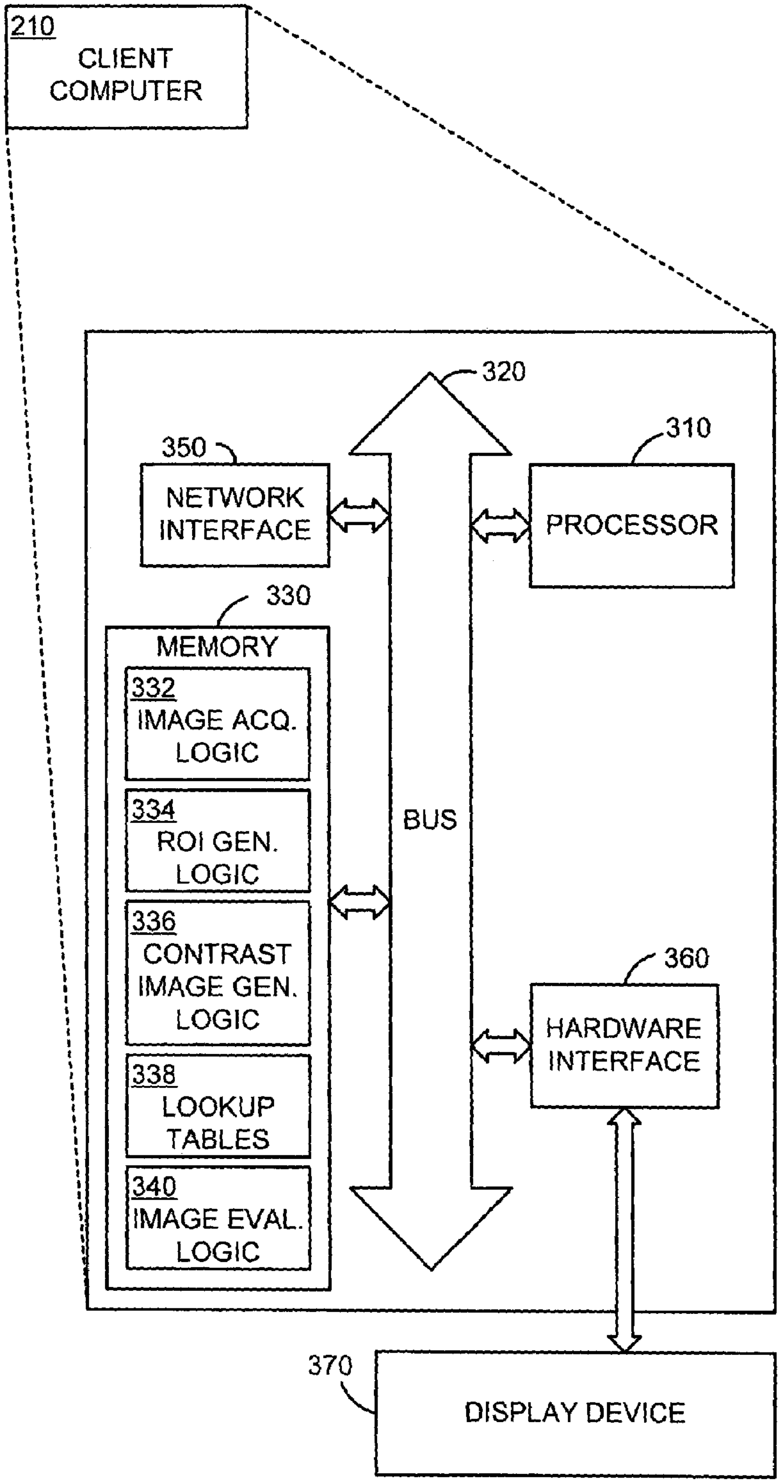
FIG. 3 is a block diagram showing component architecture of a client computer from FIG. 2.

FIG. 3 is a block diagram showing component architecture of a client computer 210 from FIG. 2. While the architecture of only one client computer is shown in FIG. 3, it should be appreciated that each of the client computers 205, 210, 215, 220 of FIG. 2 may have similar component architectures. As shown in FIG. 3, the client computer comprises a processor 310, memory 330, a network interface 350, and a hardware interface 360, which are all interconnected through a local bus 320. The hardware interface 360 is adapted to interface external components, such as a display device 370, to the bus 320. The network interface 350 is adapted to interface the client computer 210 to the Ethernet hub 225 as shown in FIG. 2. The embodiment of FIG. 3 shows the memory 330 being configured with image acquisition logic 332, ROI generation logic 334, contrast image generation logic 336, lookup tables 338, and image evaluation logic 340. In several embodiments, these logic components 332, 334, 336, 338, 340 may be specific computer codes that instruct the processor 310 to carry out functions such as image acquisition, ROI generation, contrast image generation, image evaluation, etc. As is known in the art, the memory 330 may be either volatile memory or non-volatile memory or a combination of both. While certain imaging applications are specifically shown with reference to FIG. 3, it should be appreciated that the client computer 210 may be adapted for additional functions, such as the execution of other software (not shown).

Figure 4:
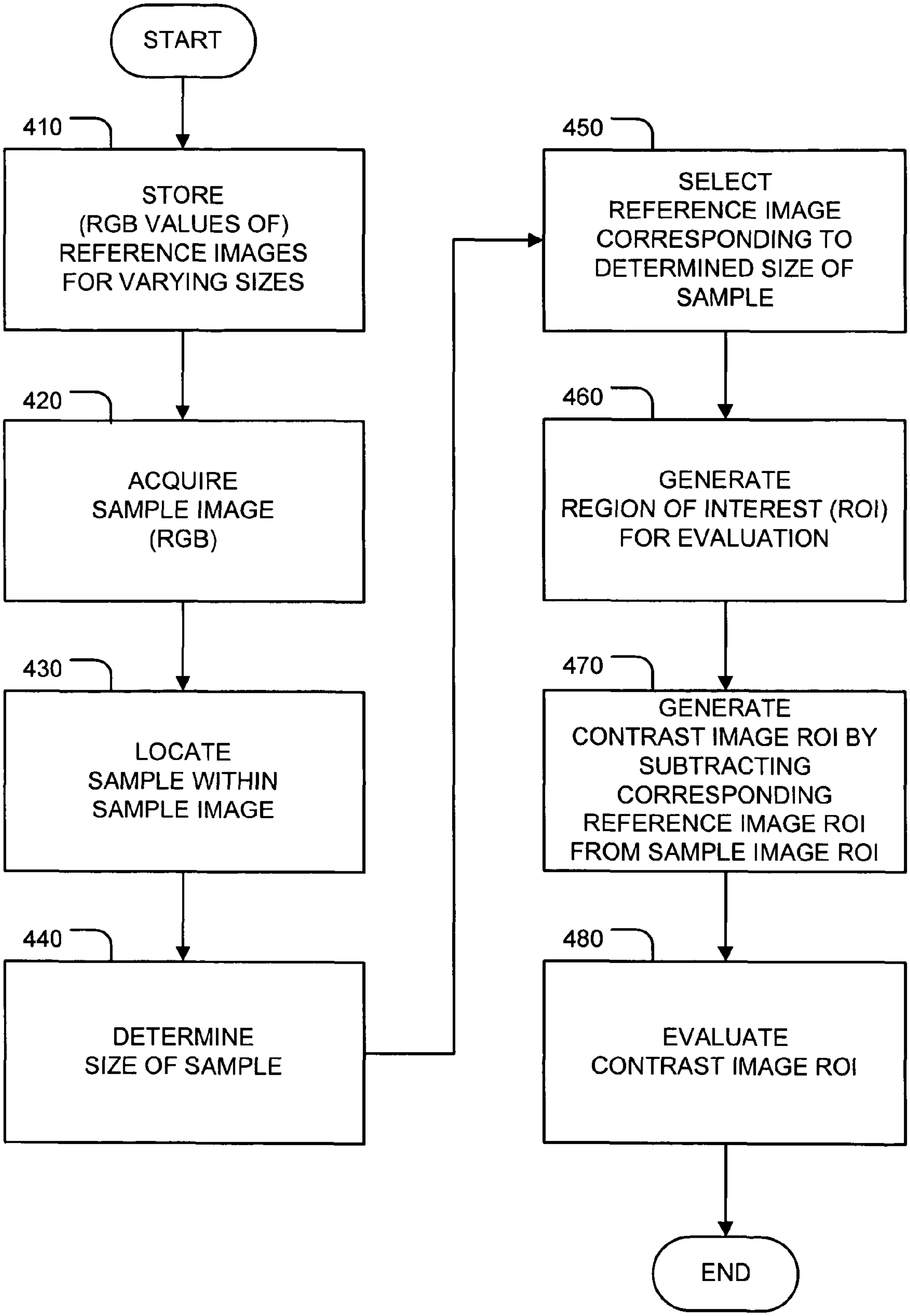
FIG. 4 is a flowchart showing a process for inspecting products.

FIG. 4 is a flowchart showing a process for inspecting food products, which may be performed by the system shown in FIGS. 1 through 3. As shown in FIG. 4, one embodiment begins with the step of storing (410) reference images associated with varying sample sizes. In several embodiments, the reference images are red-green-blue (RGB) images that have the red-, green-, and blue-color components that comprise standard color images. In this regard, each pixel in the color image may have three component values associated with each of the component colors.

If the system is adapted to image grapefruits, then each of the reference images may depict an idealized image of a grapefruit. Thus, for example, each reference image may represent a grapefruit of a different size. Since the reference images depict an idealized image of the sample, for grapefruits, the reference image may be images of round balls having a yellowish-orange hue similar to that of a healthy grapefruit.

Once the reference images have been stored (410), the system acquires (420) sample images. If the setup 100 of FIGS. 1 through 3 is used, then the sample is transported to the imaging field of view (FOV) by a conveyer system.

When the sample reaches the appropriate location in the conveyer system (e.g., within the operative field of the cameras), the cameras acquire images of the eight octants of the sample. In the example of grapefruits, each of the eight cameras would acquire images of the grapefruit from eight different angles, each of the eight different angles corresponding to one of the eight octants. In several embodiments, the acquired (420) images are RGB images, thereby permitting color comparisons to the stored (410) reference images.

Upon acquiring (420) the images, the sample is located (430) within the image. Thus, for grapefruits, the imaging system determines the location of the grapefruit from within the image. Embodiments of the sample-locating step (430) are provided and discussed in greater detail with reference to FIG. 5. Once the sample is located (430), the size of the sample is determined (440). Again, for grapefruits, the proper size of the grapefruit is determined (440) from the located image. Upon determining (440) the size of the sample, the system selects (450) a reference image that corresponds to the determined size of the sample. For grapefruits, the system would select (450) the reference image of the ball that best corresponds to the size of the sample grapefruit.

After selecting (450) the appropriate reference image, the system generates (460) a region of interest (ROI) for evaluation. In embodiments where images of octants are acquired, the ROIs are generated (460) such that there is minimal overlap between the imaged areas of each octant. For example, since each camera effectively acquires an image of the entire hemisphere of a grapefruit, images from adjacent octants would necessarily include areas that are covered by other cameras. Thus, a simple aggregate of all acquired images results in duplicative coverage of several areas of the grapefruit. In order to avoid duplicative coverage and to provide sufficient coverage, each generated ROI would be adapted to satisfy two conditions. First, that each ROI would provide minimal overlapping coverage with adjacent ROIs. Second, that the aggregate of the ROIs would leave no area uncovered. In short, the ROIs would be selected such that the entire surface of the area of the grapefruit is imaged without duplicative coverage of any area. Thus, each ROI would include the surface area of its corresponding octant.

The ROIs may be generated by manually masking each reference image. Alternatively, the ROIs may be generated by manually masking several of the reference images and utilizing iterative morphological processes, which are known in the art, to generate the ROIs for the remaining reference images. Regardless of how the ROIs are generated, it should be appreciated that the aggregate of the ROIs results in non-duplicative coverage of the entire surface area of the sample.

Upon generating (460) the ROIs, a contrast image is generated (470) by subtracting the ROI of the sample image from the corresponding ROI of the reference image. Embodiments of the generation (470) of the contrast images are provided with reference to FIG. 6. The generated (470) contrast image is then evaluated (480) to detect defects in the sample. Embodiments of the evaluation (480) process are discussed in greater detail with reference to FIG. 7.

Figure 5:
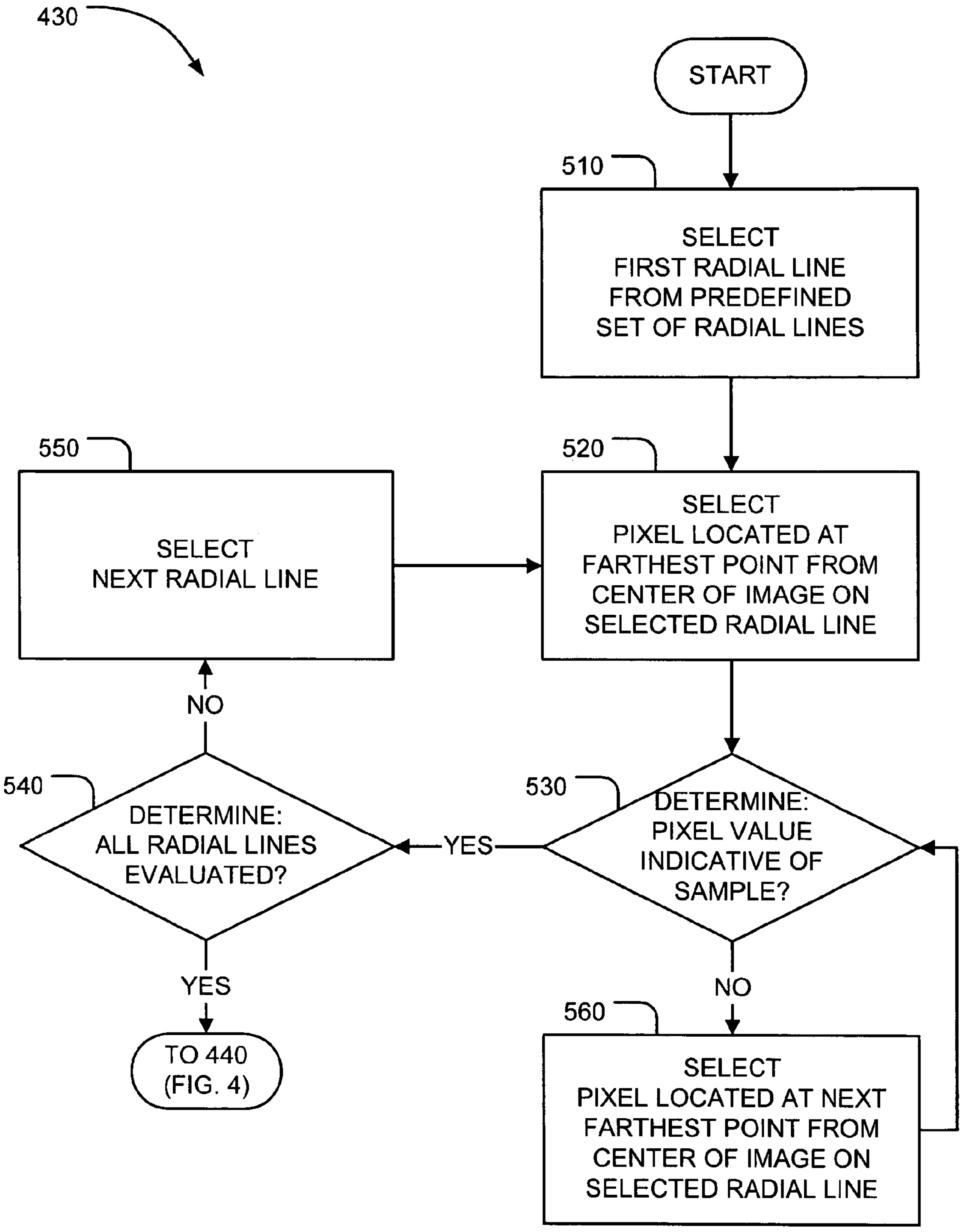
FIG. 5 is a flowchart showing the sample-locating step of FIG. 4 in greater detail.

FIG. 5 is a flowchart showing the sample-locating step (430) of FIG. 4 in greater detail. As discussed with reference to FIG. 4, once the image is acquired (420), the system locates (430) the sample within the acquired image. For example, when imaging grapefruits, the sample typically occupies only a circular portion of the entire acquired image. Thus, processing each and every pixel within the acquired image would waste computing resources. In order to avoid such inefficiencies, the sample is located (430) within the acquired image.

In several embodiments, the sample-locating step (430) begins with a selection (510) of a radial line from a set of radial lines. The radial lines emanate from the center of the acquired image to the edge of the acquired image. In this regard, each radial line traces a path between the center of the image to the periphery of the image. Once the radial line has been selected (510), a pixel located at the farthest point from the center of the image is selected (520). The selected pixel is evaluated to determine (530) if it is a sample pixel or a background pixel. Since, in example embodiments, each pixel has a red-, green-, and blue-color value (hereinafter "RGB value(s)"), these RGB values are evaluated to determine whether or not the pixel is a sample pixel. In example embodiments, acceptable RGB values are stored in a lookup table. Hence, if the pixel value deviates from the acceptable RGB values by a predefined amount, then the pixel is considered to be a non-sample pixel. On the other hand, if the pixel value does not deviate significantly from the acceptable RGB value in the lookup table, then the pixel is considered to be a sample pixel.

If the evaluated pixel is determined to be a non-sample pixel, then the next farthest pixel along the radial line is selected (560) and the evaluation process is repeated. These steps are iteratively repeated until the selected pixel is determined to be a sample pixel. If the evaluated pixel is determined to be a sample pixel, then the system determines (540) whether or not all radial lines have been evaluated. If all radial lines have not been evaluated, then the system selects (550) the next radial line and repeats the iterative process of selecting (520, 560) and evaluating (530) the pixels along the selected (550) radial line. As seen from the process of FIG. 5, the evaluation of all radial lines provides information on the periphery of the sample. Thus, for grapefruits, the evaluation of all radial lines produces an approximately-circular locus of points that traces the outer periphery of the grapefruit. This information may also be used to determine the size of the sample. In this regard, the reference image that closely corresponds to the traced periphery is selected as the reference image that is used for the generation of the contrast images.

Figure 6:
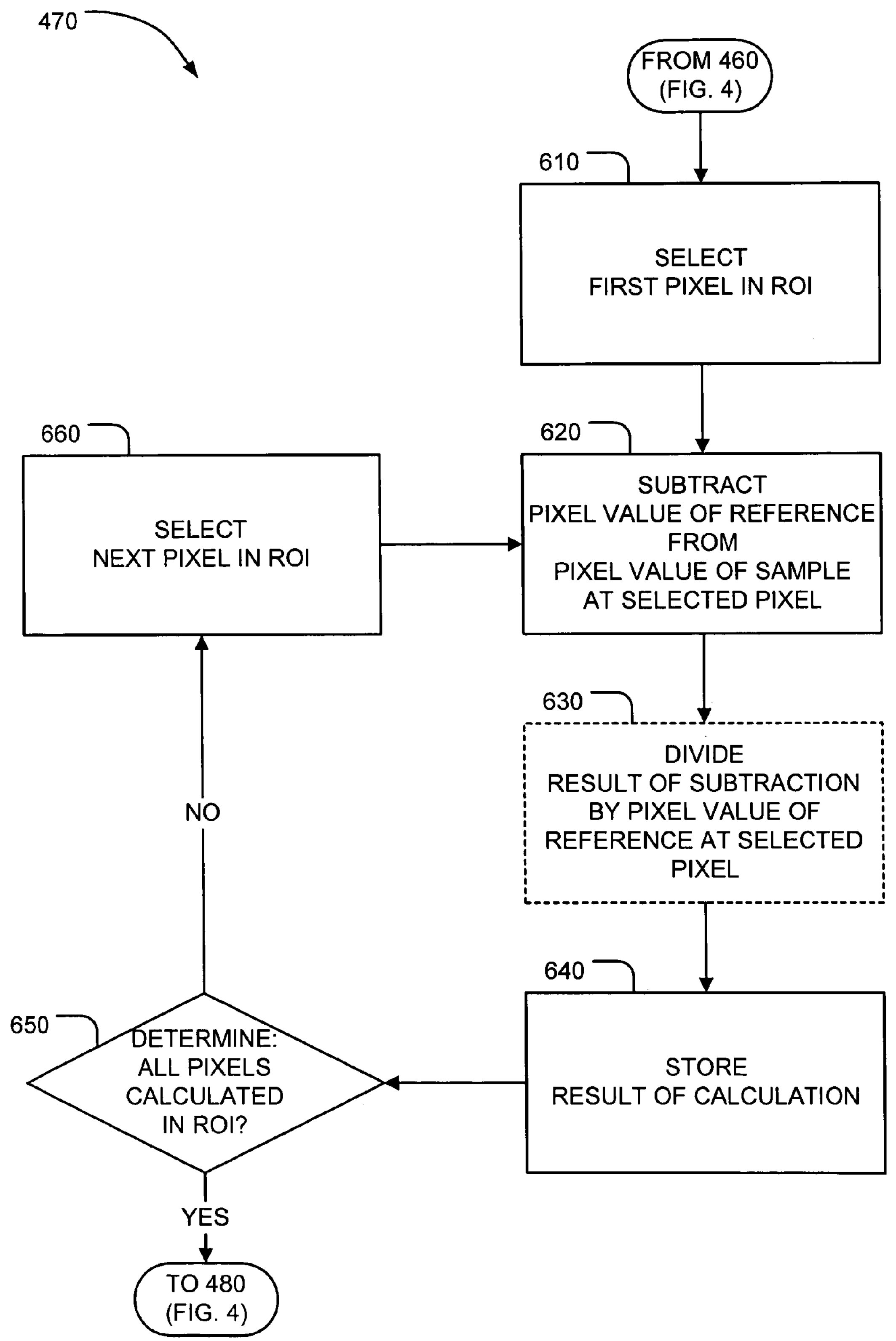
FIG. 6 is a flowchart showing the contrast-image-generating step of FIG. 4 in greater detail.

FIG. 6 is a flowchart showing the contrast-image-generating step (470) of FIG. 4 in greater detail. As shown in FIG. 6, the contrast image is generated (470) by selecting (610) the coordinate of the first pixel in the region of interest (ROI). Typically, the pixel coordinate is designated by a register address that is indicative of the pixel location. Since the same ROI is typically used for both the reference image and the sample image, the reference image and the sample image each have a register address that corresponds to the same pixel location in the ROI. Thus, for the reference image, the register address of the pixel location has one or more pixel values (e.g., red-color value, green-color value, blue-color value, etc.). Similarly, the register address of the sample image has one or more pixel values. Upon selecting (610) the first pixel location, the pixel value of the sample image for the first pixel location is subtracted (620) from the pixel value of the corresponding pixel in the reference image. An embodiment of the subtraction step (620) is shown in greater detail with reference to FIG. 8. Alternatively, the value of the reference-image pixel may be subtracted from the value of the sample-pixel image. Optionally, the result of the subtraction (620) may be normalized by dividing (630) the result of the subtraction (620) by the pixel value of the reference image at that pixel location, or by using other known normalization techniques. Since normalization techniques are known in the art, further discussion of such techniques is omitted here. The result of the calculation, whether normalized or not normalized, is then stored (640).

Upon storing (640) the first result, the system determines (650) whether or not the contrast for all of the pixels in the ROI have been calculated. If it is determined (650) that all of the pixels in the ROI have been analyzed, then the process continues to the evaluating step (480) of FIG. 4. If, on the other hand, it is determined (650) that all of the pixels in the ROI have not been analyzed, then another pixel in the ROI is selected (660). Similar to the first pixel, the subsequent pixel of the reference image and the sample image each has a register address indicative of the pixel position and a register value indicative of the pixel value at that register address. Once the next pixel has been selected (660), the process of subtracting (620), normalizing, and storing (640) is repeated until all pixels in the ROI have been evaluated. A contrast image for the ROI is generated upon completion of the process outlined in FIG. 6.

As noted above, the contrast image exhibits features that facilitate defect detection. These features are discussed in greater detail with reference to FIG. 7. For example, since grapefruits are relatively spherical in nature, the inherent shadows cast on the grapefruit due to lighting variations may result in an overall heterogeneous appearance of the grapefruit. The heterogeneity, however, is also exhibited in the reference image if the reference image is similar in appearance to the normal grapefruit. Thus, abnormal (e.g., defective) regions will be highlighted in the contrast image.

Figure 7:
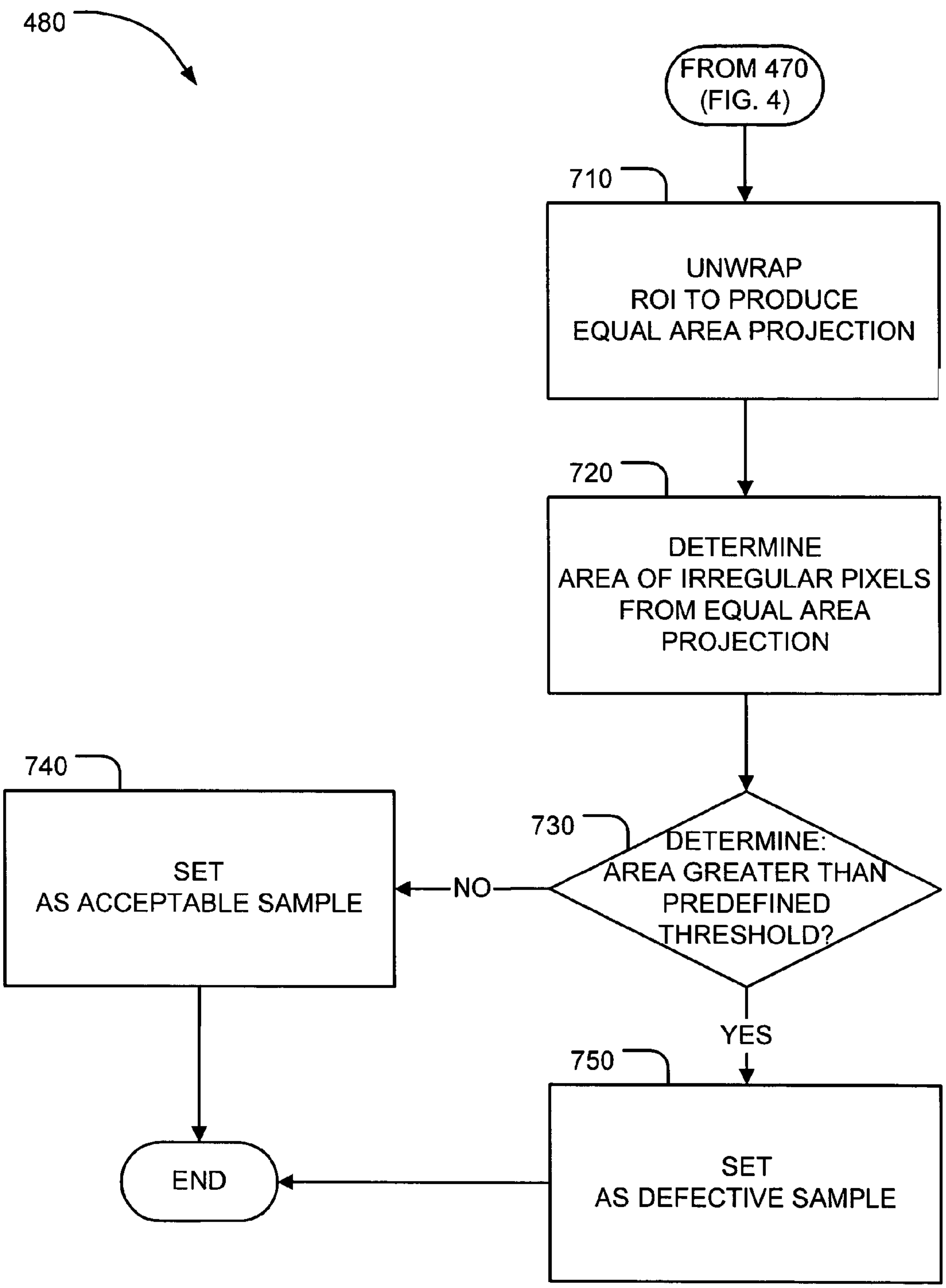
FIG. 7 is a flowchart showing the evaluating step of FIG. 4 in greater detail.

FIG. 7 is a flowchart showing the evaluating step (480) of FIG. 4 in greater detail. Specifically, FIG. 7 describes a process for evaluating defects in spherical objects such as grapefruits, oranges, etc. However, it should be appreciated that similar methods may be employed for other known topologies. Since grapefruits are relatively spherical, the image captured by one of the cameras results in an unequal area projection of the grapefruit onto that image. In order to compensate for the unequal area projection, the ROI is unwrapped (710) to produce an equal area projection. Since spherical projections onto planar surfaces have been employed in map-making, similar techniques may also be employed to map the unequal area projection onto an equal area projection. In one example, a radial weighting function may be used in which a weight is applied to certain pixels as a function of its spatial position and the determined size (or radius) of the grapefruit in order to interpolate the equal area projection of the grapefruit surface. Since such mapping techniques are known in the art, further discussion of such techniques is omitted here. However, it should be appreciated that, given a priori knowledge of the approximate three-dimensional shape of the sample, any three-dimensional shape may be unwrapped (710) to produce an equal area projection.

Once the unequal area projection has been unwrapped (710) onto an equal area projection, the system determines (720) the area of irregular pixels from the equal area projection. In some embodiments, this step is performed by counting the total number of pixels in the equal area projection and determining the percentage of irregular pixels. The irregular pixels may be defined using a number of criteria. For example, a typical grapefruit exhibits an orange-yellow hue. Thus, if an orange-yellow reference sphere is used to generate the contrast image, then the generated contrast image is a relatively homogeneous image. The reason for the relative homogeneity is because similar colors are subtracted between corresponding sample image pixels and reference image pixels, thereby effectively resulting in minimal contrast within the contrast image. Conversely, if a grapefruit exhibits a defect (e.g., green regions, dark scar, light scar, red regions or sunburn, etc.), then the resulting contrast image is relatively heterogeneous because different colors are subtracted between corresponding sample image pixels and reference image pixels. The allowable degree of heterogeneity (or variability) within the contrast image may be determined experimentally. In other words, sample pixels of various fruit classes may be accumulated and their relative clustering behavior may be observed. It should be appreciated that different samples (e.g., grapefruits, oranges, pears, or any natural product) may exhibit different visual defects. Hence, the system may be experimentally trained for each different type of sample. Since clustering algorithms are known in the art, further discussion of clustering algorithms is omitted here. However, it should be appreciated that, unlike prior approaches, the clustering algorithms are executed in the contrast space, thereby providing greater robustness in defect detection.

Once the area of irregular pixels is determined (720), the system determines whether or not the area of irregular pixels is greater than a predefined threshold area. For example, in grapefruits, if a large percentage of the overall area of the grapefruit displays a dark scar, then the grapefruit may be discarded as being defective. In this regard, not only is the qualitative contrast difference (e.g., red-color contrast, green-color contrast, blue-color contrast, etc.) indicative of whether a sample is defective, but the quantitative result (e.g., the defective area) provides an indication on whether or not the overall sample is defective. In order to reduce computational burdens, the predefined acceptability criteria, both qualitative and quantitative, may be stored in memory as lookup tables. Hence, during processing, these lookup tables may be rapidly accessed to efficiently determine whether or not certain pixels or certain samples are within the margins of acceptability.

If the system determines (730) that the irregular area is greater than the predefined threshold, then the system sets (750) that sample as being defective. On the other hand, if the system determines (730) that the irregular area is not greater than the predefined threshold, then the system sets (740) the sample as being an acceptable sample. In this regard, products exhibiting both inter-product heterogeneity and intra-product heterogeneity may be sorted using the above-described processes and systems.

Figure 8:
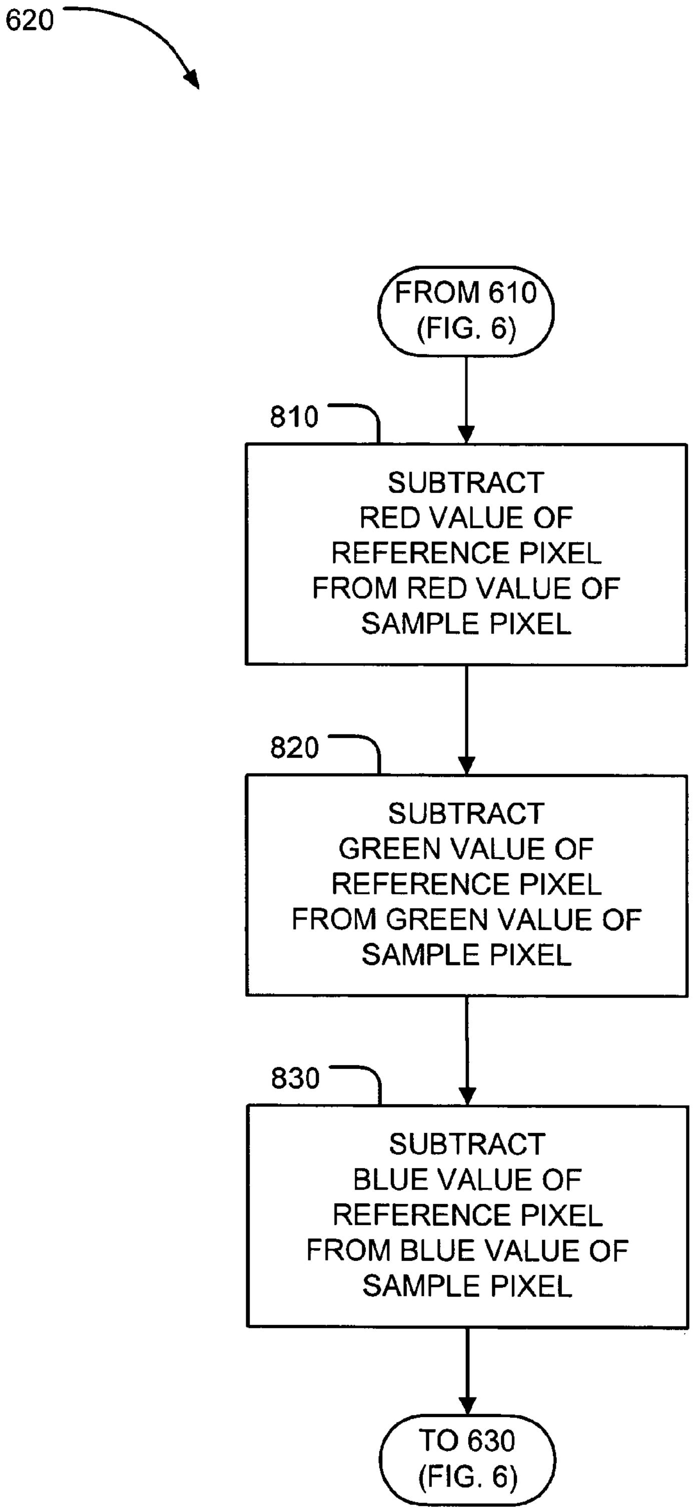
FIG. 8 is a flowchart showing the pixel subtraction step of FIG. 6 in greater detail.

FIG. 8 is a flowchart showing the pixel subtraction step (620) of FIG. 6 in greater detail. As noted above, each pixel has a pixel value. For RGB images, the pixel value is indicative of the red value, the green value, and the blue value, which are the component colors of the pixel in the RGB image. In some embodiments, the red value of the reference pixel is subtracted (810) from the corresponding red value of the sample pixel. Similarly, the green value of the reference pixel is subtracted (820) from the corresponding green value of the sample pixel. Likewise, the blue value of the reference pixel is subtracted (830) from the blue value of the sample pixel. Thus, separate contrast images are generated for the red-color space, the green-color space, and the blue-color space. This may be advantageous, for example, in grapefruit sorting. Since healthy grapefruits exhibit an orange-yellow hue, the contrast images for the blue-color space and the green-color space may exhibit a greater dynamic range than the contrast image for the red-color space. Additionally, since different types of grapefruit defects exhibit different color characteristics, the segregation of the different color spaces provides greater detail on the type of detection. These details may subsequently be used to determine the overall acceptability criteria of the grapefruit.

While grapefruits are used to illustrate the several embodiments above, it should be appreciated that different food products may exhibit different color characteristics. Hence, defects may appear more pronounced in different color spaces for different products. Similarly, while natural food products are described above to illustrate several embodiments of the invention, it should be appreciated that similar advantages may be manifest in the analysis of synthetic products.

Figure 9:
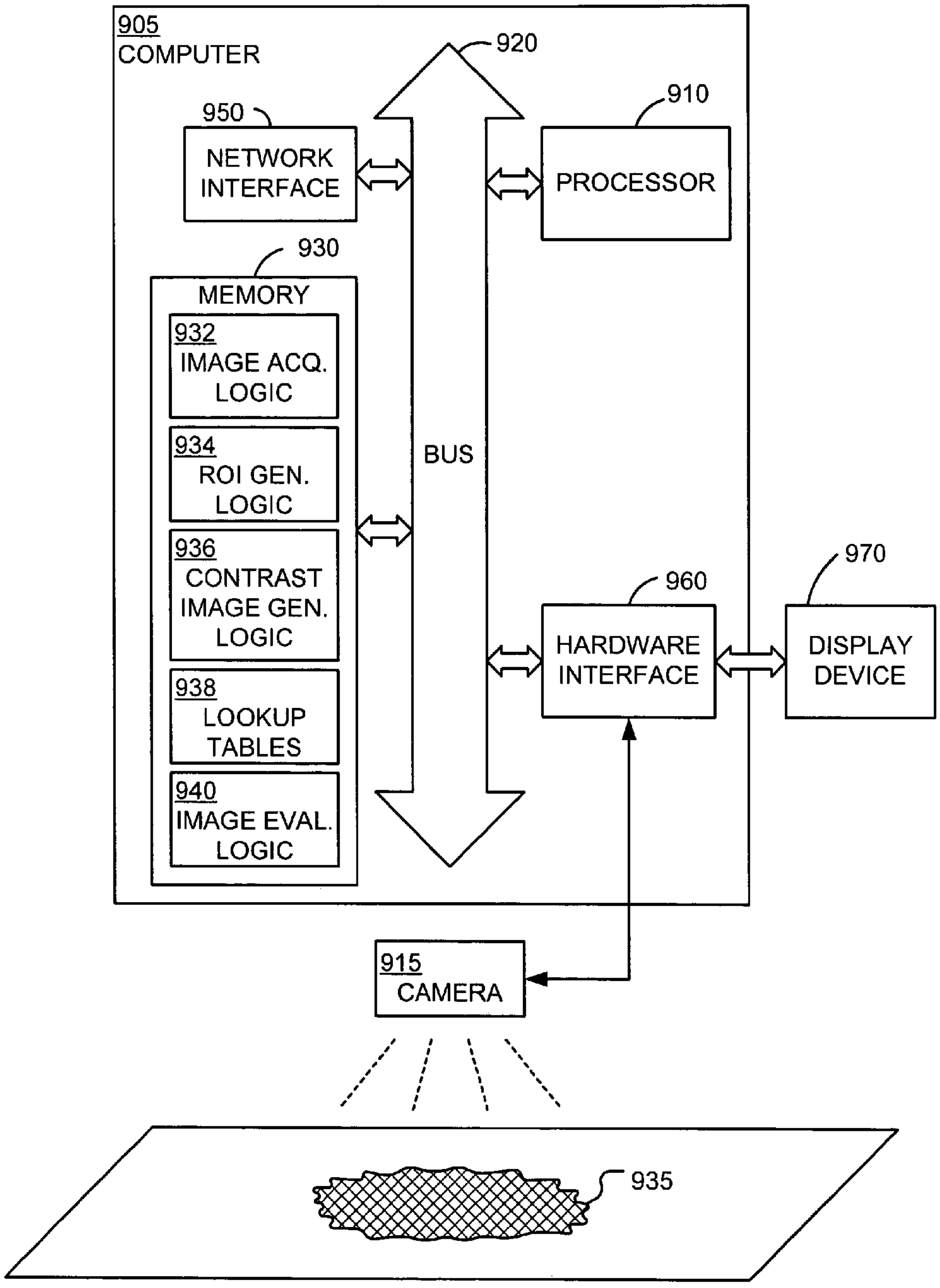
FIG. 9 is a block diagram showing an example setup for acquiring relatively planar samples.

While FIGS. 1 through 3 show an example setup 100 for a three-dimensional product with a relatively predictable topology, FIG. 9 shows an example setup for acquiring relatively planar samples. For example, while a chicken breast is a three-dimensional sample, one surface of a de-boned chicken breast (also called a breast butterfly) may be sufficiently approximated as a planar sample. In this regard, the setup of FIG. 9 may be used to generate contrast images of relatively planar samples.

As shown in FIG. 9, several embodiments employ a single computer 905 to acquire and process data, rather than a computer network as shown in FIG. 2. The single computer 905 has an architecture that is similar to the architecture of the client computer 210 of FIG. 2. In this regard, the computer 905 comprises a processor 910, memory 930, a network interface 950, and a hardware interface 960, which are all interconnected through a local bus 920. The hardware interface 960 is adapted to interface external components, such as a display device 970 and a camera 915, to the bus 920. The network interface 950 is adapted to interface the computer 905 to a network. The embodiment of FIG. 9 shows the memory 930 being configured with image acquisition logic 932, ROI generation logic 934, contrast image generation logic 936, lookup tables 938, and image evaluation logic 940. In several embodiments, these logic components 932, 934, 936, 938, 940 may be specific computer codes that instruct the processor 910 to carry out functions such as image acquisition, ROI generation, contrast image generation, image evaluation, etc. As is known in the art, the memory 930 may be either volatile memory or non-volatile memory or a combination of both. While certain imaging applications are specifically shown with reference to FIG. 9, it should be appreciated that the computer 905 may be adapted for additional functions, such as the execution of other software (not shown).

In operation, the camera 915 acquires an image of the sample 935 and conveys the image to the computer 905 for processing. Since the acquisition of images is known in the art, further discussion of image acquisition is omitted here. The acquired image is then processed by the computer 905. An example embodiment of the processing is shown in FIG. 10.

Figure 10:
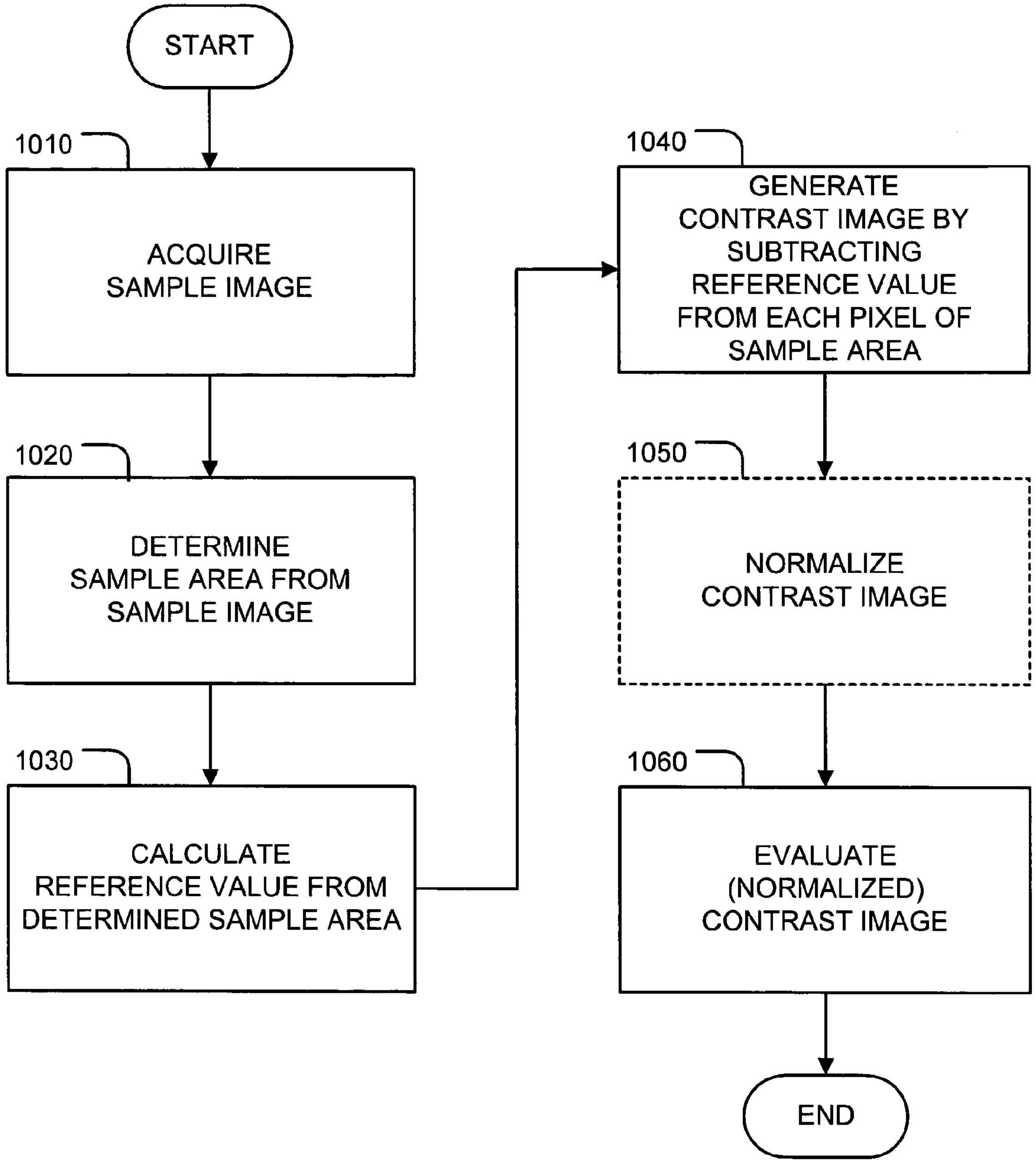
FIG. 10 is a flowchart showing another process for inspecting products.

As shown in FIG. 10, the process begins with the acquisition (1010) of the sample image. Upon acquiring (1010) the sample image, the sample area is determined (1020) from the sample image. For example, for chicken breasts, only a portion of the image is occupied by the sample itself. Hence, the peripheral pixels in the image represent either background, noise, or both. In order to avoid evaluating those pixels, the sample is segregated from the remainder of the image using known techniques. For example, snake algorithms and threshold algorithms have produced acceptable results in which the sample pixels are segregated from the non-sample pixels. Since these techniques are known in the art, further discussion of such techniques is omitted here. It should be appreciated that, unlike the embodiments of FIGS. 4 through 8, the embodiments shown with reference to FIG. 10 do not separately perform an ROI analysis since the entire sample is the ROI. In other words, once the sample-selecting algorithm (e.g., snake algorithm, etc.) segregates the sample pixels from the non-sample pixels, those sample pixels constitute the ROI.

Once the sample area has been determined (1020), a reference value is calculated (1030) from within the sample area. Hence, unlike the embodiments shown in FIGS. 4 through 8 that use a separate reference image, the embodiments described with reference to FIG. 10 generate an internal reference from the sample itself. In one embodiment, the pixel values for the entire sample are tabulated, and the mode value of the sample pixels is selected as the reference value. However, it should be appreciated that if a majority of pixels exhibit irregular appearances, then the mode value may not be the ideal reference value. In other embodiments, the mean value of the sample pixels is selected as the reference value. However, in selecting the mean value, it should be appreciated that any irregular pixels may contribute to a skewing of the mean value. Regardless of how the reference value is selected, it should be appreciated that the reference value is selected as a function of the sample itself. In this regard, inter-product heterogeneity does not present a significant problem since each sample has its own internal reference value.

Upon calculating (1030) the reference value, a contrast image is generated (1040) by subtracting the reference value from each pixel within the sample area. It should be appreciated that the multi-spectral analysis described above (e.g., separate red-color space, green-color space, and blue-color space analysis) may be employed in the contrast-image-generation step (1040) described here. The generated (1040) contrast image may optionally be normalized (1050) by dividing each pixel by the reference value, or by using other known normalization techniques. The contrast image, either normalized or not normalized, is then evaluated (1060) using similar techniques as those described above.

As shown with reference to FIGS. 1 through 10, the use of contrast images in machine-vision-based defect detection provides greater efficiency and greater accuracy in inspecting and grading products. Specifically, those products exhibiting inter-product heterogeneity (or variability) as well as intra-product heterogeneity (or variability) are more accurately segregated using contrast-based techniques similar to those described above. Additionally, unlike other approaches that acquire a reference image, the disclosed approach acquires a reference image and further generates a contrast image before determining acceptance or rejection criteria for a sample.

In addition to the above-described approaches and systems, the reference value (or reference image) may be determined using a moving average of the acquired samples. Hence, unlike the grapefruit example, in which a reference image is acquired from a fabricated model, or the de-boned chicken breast example, in which an internal reference value is generated for each sample, a reference may be calculated by acquiring a moving average of samples. In other words, the reference value, which is stored in memory, may be continually updated with information obtained from each consecutive sample. Thus, for example, a contrast image of a sixth sample may include information obtained from the first five samples. Similarly, a contrast image for a seventh sample may include information obtained during the analysis of the sixth sample, etc. In this regard, the reference image (or reference value) for such an embodiment would include information obtained from previously acquired samples. The number of previously acquired samples may be determined on an experimental basis or, alternatively, may be selected to balance computational burden and processing speed.

As shown here, the various techniques and approaches disclosed herein may be combined in a variety of permutations. Each of these permutations is intended to be within the scope of the invention.

The image acquisition logic 332, the region of interest (ROI) generation logic 334, the contrast image generation logic 336, the image evaluation logic 340, and other related logic components of the present invention can be implemented in hardware, software, firmware, or a combination thereof. In the preferred embodiment(s), the image acquisition logic 332, the region of interest (ROI) generation logic 334, the contrast image generation logic 336, the image evaluation logic 340, and other related logic components are implemented in software or firmware that is stored in a memory and that is executed by a suitable instruction execution system. If implemented in hardware, as in an alternative embodiment, the image acquisition logic 332, the region of interest (ROI) generation logic 334, the contrast image generation logic 336, the image evaluation logic 340, and other related logic components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The computer codes described above, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations may be made, none of which depart from the spirit of the present invention. For example, while grapefruits and chicken breasts have specifically been used to describe several embodiments of the invention, it should be appreciated that any heterogeneous product, either natural or synthetic, may be amenable to the approaches described above. Similarly, while a linear search algorithm is presented with reference to the radial lines, it should be appreciated that binary search algorithms or other algorithms may be used in determining the location of the sample within the acquired image. All such changes, modifications, and alterations should therefore be seen as within the scope of the present invention.

What is claimed is:

1. A method for inspecting food products, the method comprising:

(A) generating reference images of food products, each reference image being indicative of a food product of a different size, each reference image having optimized characteristics that are indicative of an acceptable food product, the optimized characteristics of each reference image comprising:

(A1) an optimized red component;

(A2) an optimized green component;

(A3) an optimized blue component; and (A4) an optimized shape;

(B) acquiring a sample image of a sample food product, the sample image comprising:

(B1) a red component;

(B2) a green component;

(B3) a blue component;

(B4) a sample shape; and (B5) a sample size;

(C) comparing the sample size to each of the generated reference images;

(D) selecting the reference image that is indicative of a food product having a size that is similar to the sample size;

(E) generating a contrast image as a function of the selected reference image and the sample image, the contrast image being indicative of deviations of the sample image from the selected reference image, the contrast image comprising:

(E1) a red component deviation value;

(E2) a green component deviation value;

(E3) a blue component deviation value; and (E4) a shape deviation value; and (F) determining an acceptability level of the sample food product, the acceptability level being a function of:

(F1) the red component deviation value;

(F2) the green component deviation value;

(F3) the blue component deviation value; and (F4) the shape deviation value.

2. A method for inspecting food products, the method comprising:

(A) acquiring a sample image of a sample food product, the sample image comprising:

(A1) a red component;

(A2) a green component; and (A3) a blue component;

(B) generating a reference value from the acquired sample image, the reference value being a function of the red component, the green component, and the blue component;

(C) generating a contrast image as a function of the reference value and the sample image, the contrast image being indicative of deviations of the sample image from the reference value, the contrast image comprising:

(C1) a red component deviation value;

(C2) a green component deviation value; and (C3) a blue component deviation value; and (D) determining an acceptability level of the sample food product, the acceptability level being a function of:

(D1) the red component deviation value;

(D2) the green component deviation value; and (D3) the blue component deviation value.

3. A method for inspecting food products, the method comprising:

generating reference images of food products, each reference image being indicative of a food product of a different size, each reference image having optimized characteristics that are indicative of an acceptable food product;

acquiring a sample image of a sample food product, the sample food product having a sample size;

comparing the sample size to each of the generated reference images;

selecting the reference image that is indicative of a food product having a size that is similar to the sample size;

generating a contrast image as a function of the selected reference image and the sample image, the contrast image being indicative of deviations of the sample image from the selected reference image; and determining an acceptability level of the sample food product from the generated contrast image.

4. A method for detecting defects in products, the method comprising:

providing reference data having reference features, the reference features representing features of an optimized product;

acquiring sample data having sample features, the sample features representing features of a sample product, each of the sample features corresponding to one of the reference features;

generating contrast data as a function of the reference data and the sample data, the contrast data having contrast features, the contrast features representing deviations between the sample features and the reference features; and determining an acceptability level of the sample product from the generated contrast data.

5. The method of claim 4, further comprising:

discarding the sample product in response to determining that the acceptability level of the sample product is below an acceptable threshold level.

6. The method of claim 4, further comprising:

retaining the sample product in response to determining that the acceptability level of the sample product is not below an acceptable threshold level.

7. The method of claim 4, wherein the step of acquiring the sample data comprises:

acquiring an image of a food product.

8. The method of claim 7, wherein the food product is selected from a group consisting of:

meats;

grains vegetables;

fruits;

legumes; and processed food items.

9. The method of claim 4, wherein the step of providing the reference data comprises:

acquiring an image of the optimized product, the optimized product having minimal defects; and storing the acquired image.

10. The method of claim 4, wherein the step of providing the reference data comprises:

evaluating data points within the sample data;

calculating the mode of the data points; and storing the mode.

11. The method of claim 4, wherein the step of providing the reference data comprises:

evaluating data points within the sample data;

calculating the mean of the data points; and storing the mean.

12. The method of claim 4, wherein the step of providing the reference data comprises:

updating a reference value of a current sample with a reference value of a previous sample.

13. The method of claim 4, wherein the step of generating the contrast data comprises:

determining a difference between the reference data and the sample data to generate difference data.

14. The method of claim 13, wherein the step of determining the difference comprises:

extracting spectral components from the reference data;

extracting spectral components from the sample data, each of the spectral components of the sample data corresponding to one of the spectral components of the reference data; and determining the difference between a spectral component from the reference data and a corresponding spectral component from the sample data.

15. The method of claim 14, wherein the step of extracting the spectral components from the reference data comprises a step selected from the group consisting of:

extracting a red component from the reference data;

extracting a green component from the reference data; and extracting a blue component from the reference data.

16. The method of claim 14, wherein the step of extracting the spectral components from the sample data comprises a step selected from the group consisting of:

extracting a red component from the sample data;

extracting a green component from the sample data; and extracting a blue component from the sample data.

17. The method of claim 13, further comprising:

normalizing the difference data to the reference data.

18. The method of claim 4, wherein the step of determining the acceptability level comprises:

clustering the contrast features into predetermined cluster groups, each cluster group corresponding to a contrast feature; and evaluating the size of each cluster group to quantitatively determine the amount of each contrast feature.

19. The method of claim 18, wherein at least one of the cluster groups corresponds to a defect feature.

20. The method of claim 4, further comprising:

updating the reference data with information gathered from the sample data.

21. A system for detecting defects in products, the system comprising:

reference data having reference features, the reference features representing features of an optimized product;

sample data having sample features, the sample features representing features of a sample product, each of the sample features corresponding to one of the reference features;

logic configured to generate contrast data as a function of the reference data and the sample data, the contrast data having contrast features, the contrast features representing deviations between the sample features and the reference features; and logic configured to determine an acceptability level of the sample product from the generated contrast data.

22. The system of claim 21, wherein the food product is selected from a group consisting of:

meats;

grains vegetables;

fruits;

legumes; and processed food items.

* * * * *